(12) United States Patent
Matsumoto et al.

(10) Patent No.: US 8,212,960 B2
(45) Date of Patent: Jul. 3, 2012

(54) DISPLAY APPARATUS

(75) Inventors: Hiroyuki Matsumoto, Tottori (JP); Kimiyoshi Takemoto, Tottori (JP); Toru Fukui, Tottori (JP)

(73) Assignee: Sony Corporation, Tokyo (JP)

( * ) Notice: Subject to any disclaimer, the term of this patent is extended or adjusted under 35 U.S.C. 154(b) by 947 days.

(21) Appl. No.: 11/812,118

(22) Filed: Jun. 15, 2007

(65) Prior Publication Data

US 2007/0290985 A1    Dec. 20, 2007

(30) Foreign Application Priority Data

Jun. 15, 2006  (JP) ................... 2006-166013
Jun. 15, 2006  (JP) ................... 2006-166014
Feb. 8, 2007   (JP) ................... 2007-028830

(51) Int. Cl.
*G02F 1/1335* (2006.01)
(52) U.S. Cl. ....................................... 349/61
(58) Field of Classification Search .................. 349/61
See application file for complete search history.

(56) References Cited

U.S. PATENT DOCUMENTS

| 5,963,287 | A  | * | 10/1999 | Asada et al. ................ 349/150 |
| 5,998,783 | A  | * | 12/1999 | Stridsberg ............... 250/231.13 |
| 6,964,500 | B2 | * | 11/2005 | Sakai ......................... 362/276 |
| 7,839,091 | B2 | * | 11/2010 | Kohashikawa et al. ....... 315/151 |
| 2003/0043107 | A1 | * | 3/2003 | Ruby et al. ................... 345/102 |

FOREIGN PATENT DOCUMENTS

| JP | U-05-043129  |   | 6/1993 |
| JP | 06-130370    |   | 5/1994 |
| JP | 06130370 A   | * | 5/1994 |
| JP | 2000-315596  |   | 11/2000 |
| JP | A-2000-340388|   | 12/2000 |
| JP | A-2004-111810|   | 4/2004 |

* cited by examiner

*Primary Examiner* — Uyen Chau N Le
*Assistant Examiner* — Chris Chu
(74) *Attorney, Agent, or Firm* — K&L Gates LLP (57) ABSTRACT

In a display apparatus including: a display panel; a backlight unit disposed on the rear side of the display panel; a circuit board disposed on a side of the backlight unit which is different from the display panel side; and a brightness sensor for measuring brightness of light from the backlight unit, the brightness sensor is supported on a side of the circuit board which is different from the backlight unit side.

13 Claims, 9 Drawing Sheets

DISPLAY APPARATUS

This application is based on Japanese Patent Applications No. 2006-166013 and No. 2006-166014 filed on Jun. 15, 2006, and No. 2007-028830 filed on Feb. 8, 2007, the contents of which are hereby incorporated by reference.

BACKGROUND OF THE INVENTION

1. Field of the Invention

The present invention relates to a display apparatus, in particular a display apparatus equipped with a brightness sensor for measuring brightness of light from a backlight unit.

2. Description of Related Art

Conventionally, a liquid crystal display apparatus that utilizes a change in optical property of liquid crystal for display is known as a display apparatus. Such a liquid crystal display apparatus is provided with a backlight unit disposed on the rear side of the liquid crystal display panel, and light emitted from the backlight unit irradiates the liquid crystal display panel so that characters and images can be displayed. In addition, there is known a conventional technique for adjusting brightness of light emitted from the backlight unit by using data measured by a brightness sensor (see JP-A-2000-315596, for example).

The above mentioned document JP-A-2000-315596 (hereinafter referred to as a "conventional technique") discloses a structure of a backlight unit including a brightness sensor that delivers a brightness measured signal to a control device (not shown) via a lead wire and is fixed to an opening portion disposed on the rear side of a casing that houses a lamp and a light guide as shown in FIG. 1 of the conventional technique. In addition, the above mentioned conventional technique also discloses a structure of a backlight unit in which an attachment member is disposed on the rear side of the casing, and a brightness sensor is attached to a surface of the attachment member that is closer to the backlight case as shown in FIG. 3 of the conventional technique. Furthermore, in the example shown in FIG. 1 of the above mentioned conventional technique, the lead wire of the brightness sensor is drawn out to the rear side of the backlight unit. Therefore, it is considered that the control device (not shown) of the liquid crystal display apparatus is connected to the brightness sensor electrically via the lead wire of the brightness sensor.

However, the structure shown in FIG. 1 of the above mentioned conventional technique does not clarify a method of fixing the brightness sensor, and there is a problem that this fixing method needs a component. In addition, the conventional technique does not clarify also a method of connecting the lead wire, and there is a problem that a connector or a manual work of soldering is necessary. In addition, there is also a problem that the brightness sensor may be affected largely by temperature if it is attached directly to the casing because brightness detection output of the brightness sensor varies in accordance with temperature. Furthermore, the structure disclosed in the above mentioned conventional technique needs a space for routing the lead wire of the brightness sensor, so there is a problem that it becomes difficult to downsize the display apparatus.

The structure disclosed in the example shown in FIG. 3 of the above mentioned conventional technique has a problem that thickness of the backlight unit increases because the brightness sensor is attached to a surface of the attachment member that is closer to the backlight case. Although the conventional technique does not disclose, if a control circuit board that is connected to the display panel is used as the attachment member too, the surface opposite to the surface on which the brightness sensor is attached as the example shown in FIG. 3 of the conventional technique becomes a component side for a reason of assembling matter, because a flexible printed circuit board for a gate driver and a flexible printed circuit board for a source driver that extend in directions perpendicular to each other are connected to the control circuit board. For this reason, even if the control circuit board that is connected to the display panel is also used as the attachment member, thickness of the backlight unit increases. In addition, the work of attaching the brightness sensor onto the surface that is opposite to the normal component side will become difficult. Further, there is a problem that brightness detection output of the brightness sensor is affected largely by temperature because the brightness sensor is close to the casing that becomes high temperature.

SUMMARY OF THE INVENTION

In view of the above described problems, it is an object of the present invention to provide a display apparatus that is capable of suppressing addition of components for fixing the brightness sensor, suppressing temperature error, providing good assembling workability and being downsized.

To attain the above described object, a display apparatus in accordance with a first aspect of the present invention includes: a display panel; a backlight unit disposed on the rear side of the display panel; a circuit board disposed on a side of the backlight unit which is different from the display panel side; and a brightness sensor for measuring brightness of light from the backlight unit. Further, the display apparatus is characterized by a structure in which the brightness sensor is supported on a side of the circuit board which is different from the backlight unit side.

As described above concerning the display apparatus according to the above mentioned first aspect, the brightness sensor is mounted on the surface which is different from the backlight unit side. Thus, it is able to suppress a change in a brightness detection output of the brightness sensor due to high temperature of the backlight unit.

In the display apparatus in accordance with the above described first aspect of the present invention, preferably, a control circuit for the display panel is disposed on the circuit board, and the circuit board is connected to the display panel electrically via a flexible printed circuit board including signal lines. In this way, as the control circuit of the display panel that is used for the backlight unit, is also mounted on the circuit board used for mounting the brightness sensor, a size of the backlight unit does not need to be large compared with a case where a special circuit board for mounting the brightness sensor is added.

In the display apparatus in accordance with the above described second aspect of the present invention, preferably, the display panel is a liquid crystal panel in which each pixel has a TFT, the flexible printed circuit board is made up of a first flexible printed circuit board including signal lines of source drivers and a second flexible printed circuit board including signal lines of gate drivers, and the first and the second flexible printed circuit boards are extended in directions that are perpendicular to each other. Since the flexible printed circuit boards that are connected as described above are extended in directions that are perpendicular to each other, the connector for connecting the flexible printed circuit board is mounted on the side which is different from the backlight unit side for the reason of assembling matter. Therefore, the connector is mounted on the same side as the brightness sensor, so that the circuit board can have a single component side. Thus, compared with a case of double component sides, a size of the backlight unit does not need to be large. In addition, it is not necessary to mount components on both sides of the circuit board, so that manufacturing process of the circuit board can be simplified.

In the display apparatus in accordance with the above described first aspect of the present invention, preferably, the circuit board has an opening portion for the light from the backlight unit to pass through, and the brightness sensor receives light that passes through the opening portion of the circuit board. Using the circuit board having the opening portion through which the light from the backlight unit can pass as described above, the light from the backlight unit can illuminate the brightness sensor even though the brightness sensor is mounted on the surface of the circuit board which is different from the backlight unit side. Thus, it is able to suppress occurrence of the problem that accuracy of measuring brightness with the brightness sensor may be deteriorated because the light from the backlight unit is not blocked by the circuit board.

In the display apparatus in accordance with the above described fourth aspect of the present invention, preferably, the brightness sensor is disposed so as to cross the opening portion of the circuit board. According to this structure, the light that passes through the opening portion of the circuit board can illuminate the brightness sensor easily.

In the display apparatus in accordance with the above described fourth aspect of the present invention, preferably, the brightness sensor has a light receiving portion formed on a surface of the brightness sensor that is closer to the component side, and the light receiving portion of the brightness sensor is disposed at a region corresponding to the opening portion of the circuit board. According to this structure, the light receiving portion of the brightness sensor that is mounted on the surface of the circuit board which is different from the backlight unit side can be directed to the backlight unit. In this case, since the light receiving portion of the brightness sensor is disposed in a region corresponding to the opening portion of the circuit board, the light from the backlight unit can enter the light receiving portion of the brightness sensor efficiently so that accuracy of measuring brightness with the brightness sensor can be improved.

In the display apparatus in accordance with the above described fourth aspect of the present invention, preferably, the display apparatus further includes an electronic component mounted on a surface of the circuit board, which is different from the backlight unit side. According to this structure, it is not necessary to mount components on both sides of the circuit board unlike the case where the brightness sensor is mounted on the surface of the circuit board that is closer to the backlight unit. Thus, the manufacturing process of the circuit board can be simplified.

In the display apparatus in accordance with the above described first aspect of the present invention, preferably, the circuit board is made up of a first circuit board, a second circuit board and a connecting member, the second circuit board is disposed on a side of the first circuit board which is different from the backlight unit side, so that at least a part thereof faces the first circuit board, the connecting member is disposed between the first circuit board and the second circuit board so as to connect the first circuit board with the second circuit board electrically, and the brightness sensor is mounted on the second circuit board. As described above, since the second circuit board on which the brightness sensor is mounted, is disposed on the surface of the first circuit board which is different from the backlight unit side, to which the display panel is connected, the component side of the second circuit board can face the backlight unit also in a case where the light receiving portion of the brightness sensor is formed on the surface of the brightness sensor that is opposite to the mounting surface in the display apparatus having a structure in which the component side of the first circuit board faces the side which is different from the backlight unit side. In addition, since the brightness sensor is mounted on the component side of the second circuit board, the light receiving portion of the brightness sensor can face the backlight unit. Thus, it is able to suppress a change in a brightness detection output of the brightness sensor due to high temperature of the backlight unit also in the case where the light receiving portion of the brightness sensor is formed on the surface of the brightness sensor that is opposite to the mounting surface.

In the display apparatus in accordance with the above described eighth aspect of the present invention, preferably, the first circuit board has a first component side, on which an electronic component is mounted, on the surface which is different from the backlight unit side, and the second circuit board has a second component side, on which the brightness sensor is mounted, on the surface that is closer to the backlight unit. According to this structure, since the brightness sensor is mounted on the second component side of the second circuit board, the light receiving portion of the brightness sensor that is mounted on the second circuit board can face the backlight unit easily also in a case where the light receiving portion of the brightness sensor is formed on the surface of the brightness sensor that is opposite to the mounting surface.

In the display apparatus in accordance with the above described eighth aspect of the present invention, preferably, the connecting member includes a first connecting member and a second connecting member that are engaged and connected electrically to each other, the first connecting member is mounted on a first component side of the first circuit board, while the second connecting member is mounted on a second component side of the second circuit board, and the first connecting member and the second connecting member are engaged with each other so that the first circuit board and the second circuit board are connected electrically to each other. According to this structure, the first circuit board can be connected electrically to the second circuit board easily without complicated route of wiring.

In the display apparatus in accordance with the above described ninth aspect of the present invention, preferably, the brightness sensor has a light receiving portion formed on a surface of the brightness sensor which is different from the component side and is mounted on the second component side of the second circuit board. According to this structure, the light receiving portion of the brightness sensor can face the backlight unit easily.

In the display apparatus in accordance with the above described eighth aspect of the present invention, preferably, the first circuit board has a part that covers a region corresponding to a mounting region of the brightness sensor, and an opening portion for lighting is formed in the part of the first circuit board that covers the region corresponding to the mounting region of the brightness sensor. According to this structure, a component mountable area can be larger than that in a case of using a first circuit board that does not have the part covering a region corresponding to a mounting region of the brightness sensor. Therefore, flexibility in designing a wiring pattern on the component side (first component side) of the first circuit board can be improved. In this case, since the opening portion for lighting is formed on the part of the first circuit board that covers a region corresponding to a mounting region of the brightness sensor, it is able to suppress occurrence of the problem that accuracy of measuring brightness with the brightness sensor may be deteriorated because the light from the backlight unit is not blocked by the first circuit board.

As described above, according to the present invention, it is able to realize a display apparatus that is capable of suppressing addition of components for fixing the brightness sensor, suppressing temperature error, having a good workability of assembling, and being downsized.

DETAILED DESCRIPTION OF THE PREFERRED EMBODIMENTS

Hereinafter, embodiments of the present invention will be described with reference to the attached drawings. A light receiving portion is formed on a mounting surface in some brightness sensors, while it is formed on the surface opposite to the mounting surface in other brightness sensors. A first embodiment is an example of a case where the light receiving portion is formed on the mounting surface, while a second embodiment is an example of a case where the light receiving portion is formed on the surface opposite to the mounting surface.

First Embodiment

Figure 1:
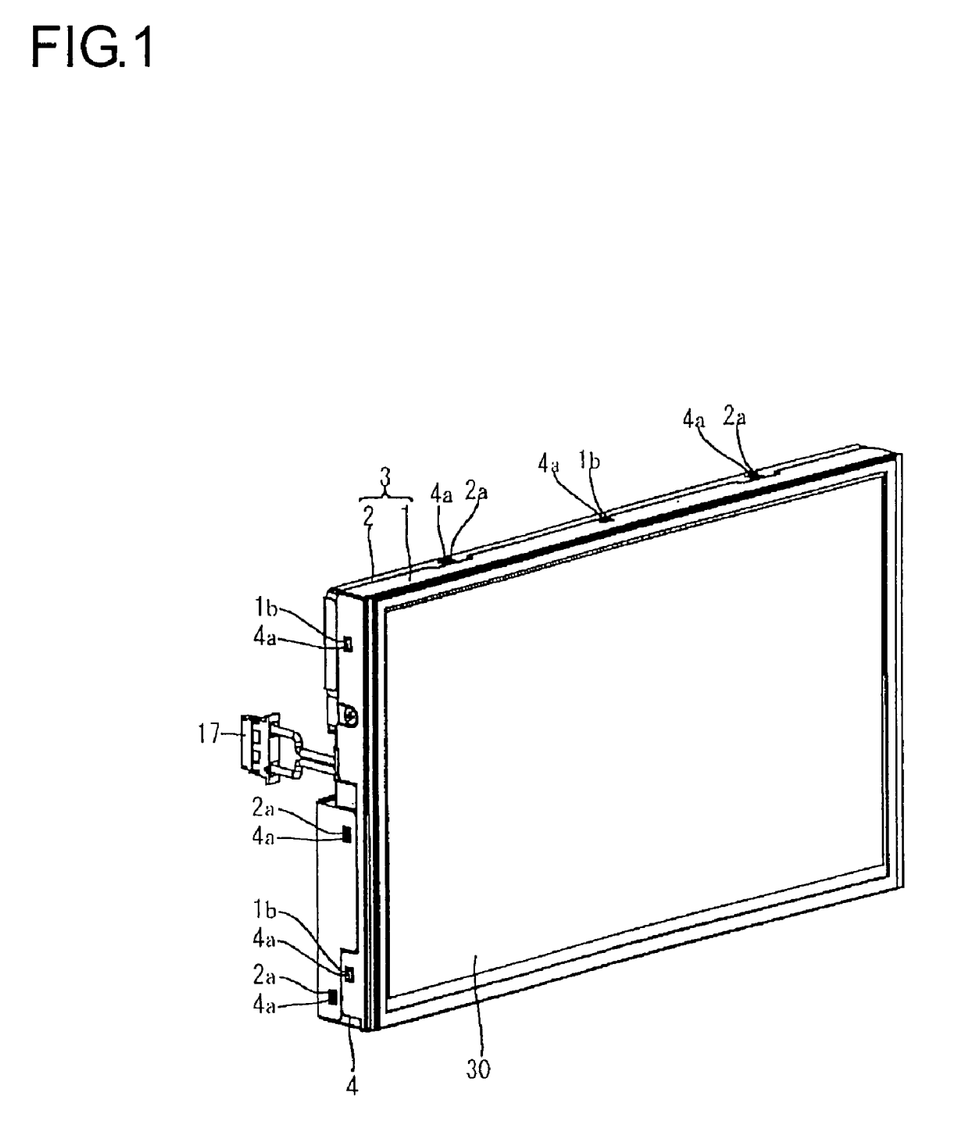
FIG. 1 is a perspective view from the front side of a display apparatus according to the present invention.
Figure 2:
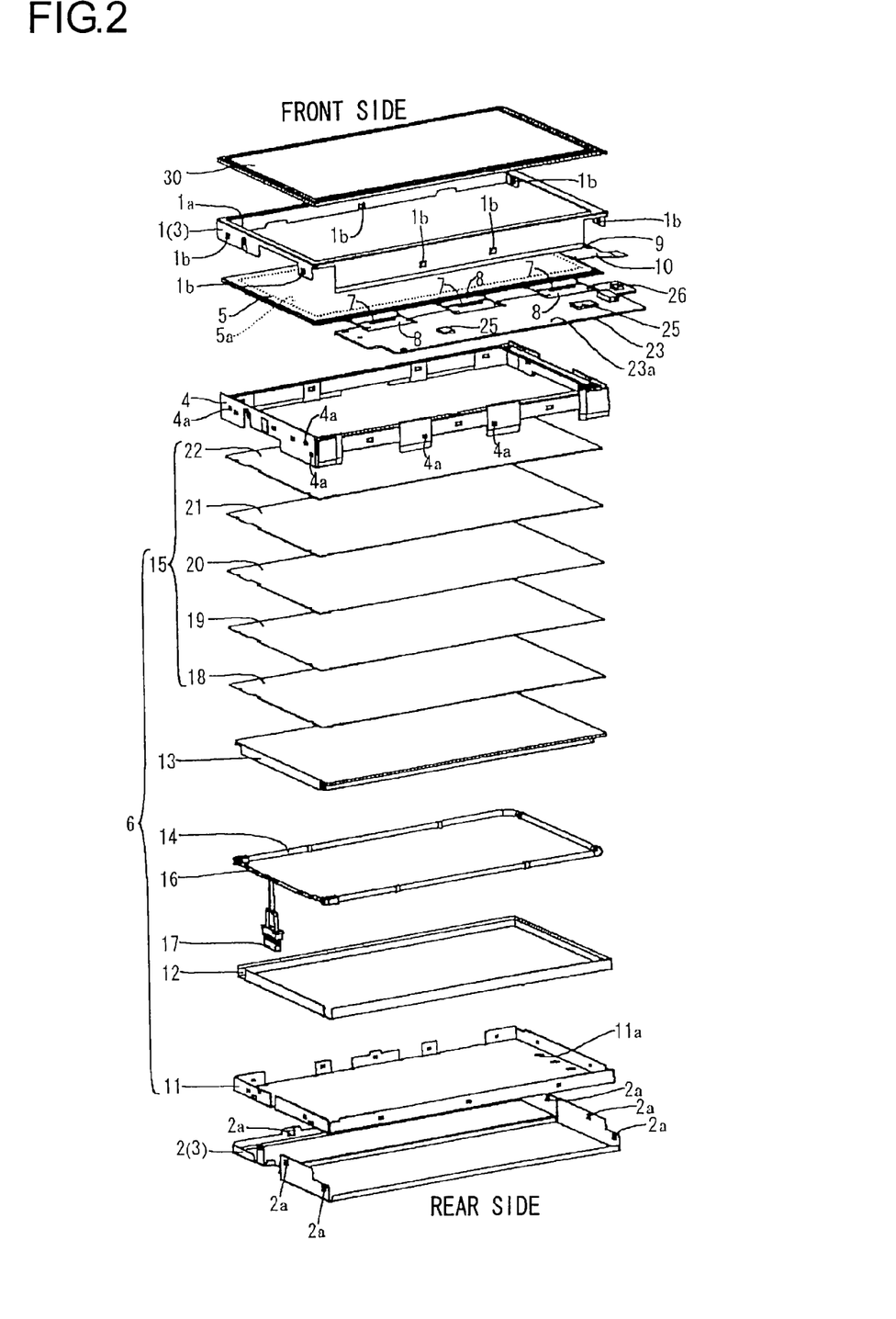
FIG. 2 is an exploded perspective view of a display apparatus according to a first embodiment.
Figure 3:
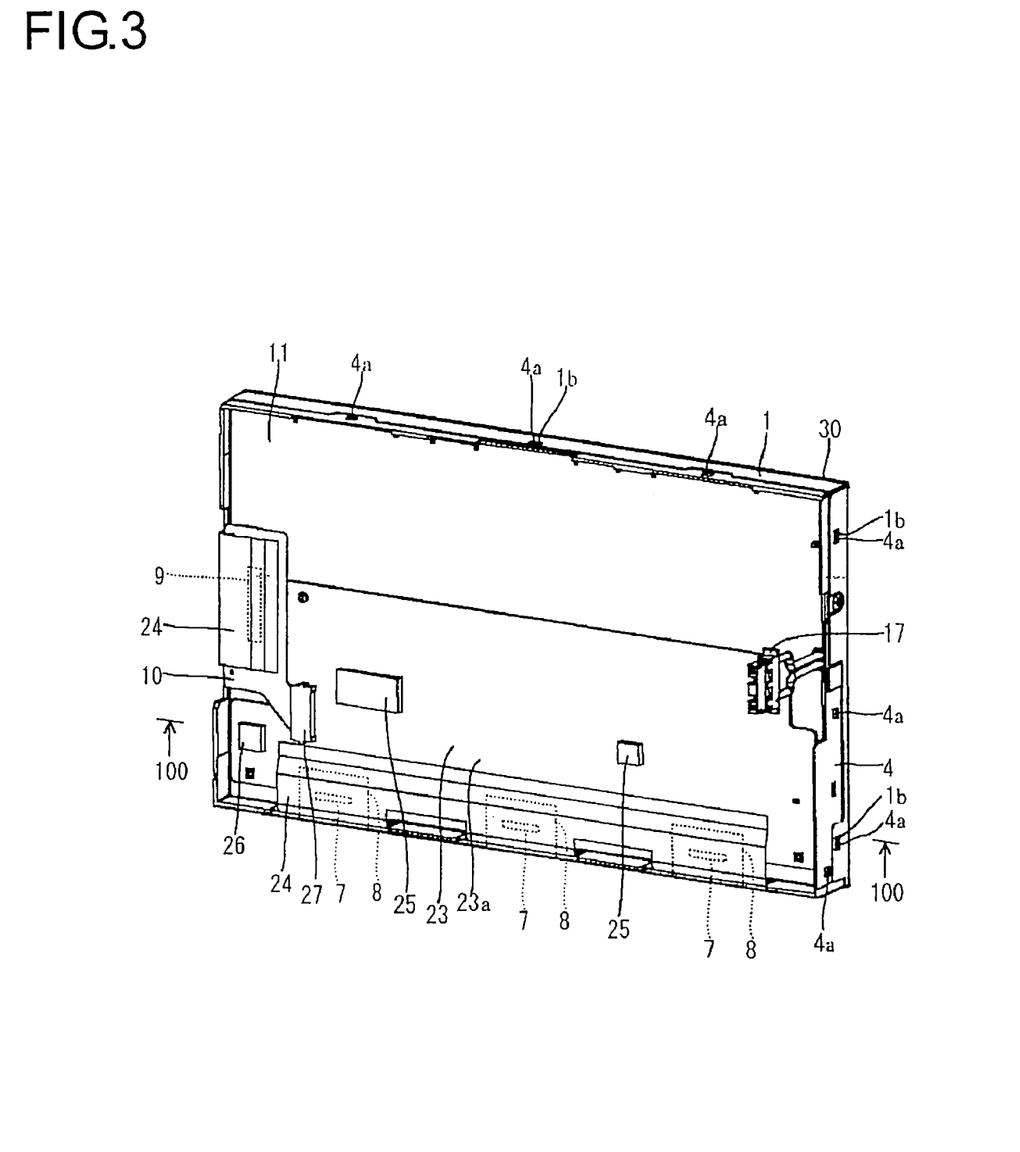
FIG. 3 is a perspective view from the rear side of the display apparatus shown in FIG. 2.
Figure 4:
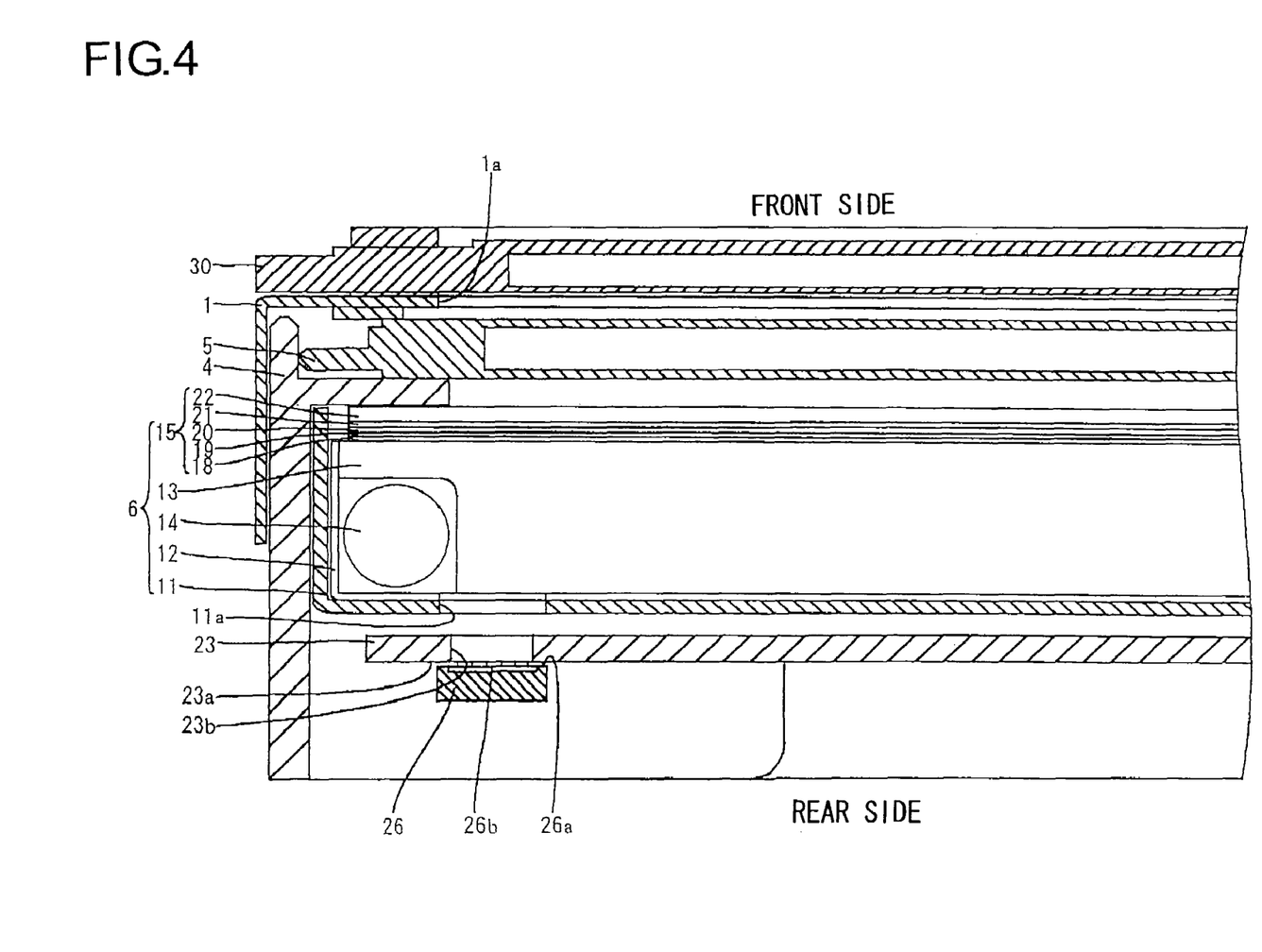
FIG. 4 is a partial cross sectional view of the display apparatus when cut along the line 100-100 in FIG. 3.

FIG. 1 is a perspective view from the front side of a liquid crystal display apparatus (a display apparatus) according to the first embodiment of the present invention. FIG. 2 is an exploded perspective view of the liquid crystal display apparatus according to the first embodiment shown in FIG. 1. FIG. 3 is a perspective view from the rear side of the display apparatus according to the first embodiment shown in FIG. 1 (in a state where a rear side case is removed from the liquid crystal display apparatus). FIG. 4 is a partial cross sectional view when cut along the line 100-100 in FIG. 3 (a part around the brightness sensor). First, a structure of the liquid crystal display apparatus according to the first embodiment will be described with reference to FIGS. 1-4.

In the present embodiment, a front side case 1 disposed on the front side and a rear side case 2 disposed on the rear side constitute a case 3 of the liquid crystal display apparatus as shown in FIGS. 1 and 2. Each of the front side case 1 and the rear side case 2 that constitute the case 3 is made of a metal sheet having a thickness of approximately 0.3 mm. In addition, the front side case 1 has side portions formed by bending the metal sheet toward the rear side, while the rear side case 2 has side portions formed by bending the metal sheet toward the front side. Furthermore, a frame 4 is disposed inside the case 3. This frame 4 is made of polycarbonate resin and has side portions extending along the inner surface of the case 3.

Further as shown in FIG. 2, the front side case 1 is provided with an opening portion 1a for exposing a display region 5a of a liquid crystal display panel 5 that will be described later. In addition, the side portion of the front side case 1 is provided with a plurality of engaging holes 1b, while the side portion of the rear side case 2 is provided with a plurality of engaging holes 2a. In addition, the side portion of the frame 4 is provided integrally with a plurality of protrusions 4a. Then, as shown in FIG. 1, each the plurality of protrusions 4a of the frame 4 engages one of the plurality of engaging holes 1b of the front side case 1 or one of the plurality of engaging holes 2a of the rear side case 2. Thus, the frame 4 is fixed to the case 3 inside the case 3.

In addition, as shown in FIGS. 2 and 4, the case 3 houses the liquid crystal display panel 5 and the backlight unit 6 that is provided to the rear side of the liquid crystal display panel 5. At this point, the liquid crystal display panel 5 is an example of the "display panel" of the present invention. In addition, the front side of the case 3 (front side case 1) is provided with a touch panel 30 for operating the liquid crystal display apparatus.

The liquid crystal display panel 5 has an active matrix structure. More specifically, although not shown, each pixel of the liquid crystal display panel 5 is provided with a thin film transistor (TFT). Further as shown in FIG. 2, a source (not shown) of the TFT of the liquid crystal display panel 5 is connected to a flexible printed circuit (FPC) 8 including a source driver 7, and a gate (not shown) of the TFT of the liquid crystal display panel 5 is connected to a FPC 10 including a gate driver 9.

In addition, as shown in FIGS. 2 and 4, the backlight unit 6 is made up of a backlight cover 11, a reflecting sheet 12, a light guide 13, a light source 14, and optical sheets 15. The backlight cover 11 is made of a metal sheet and has side portions formed by bending the metal sheet toward the front side. Then, the reflecting sheet 12, the light guide 13, the light source 14 and the optical sheets 15 are housed in the backlight cover 11. The reflecting sheet 12 is made of polyester resin and is disposed on the bottom surface (surface of the front side) of the backlight cover 11. In addition, the reflecting sheet 12 has side portions disposed along the inner surface of the backlight cover 11. The light guide 13 is made of a transparent resin such as an acrylic resin and is disposed on the front side of the reflecting sheet 12 so as to be surrounded by the side portions of the reflecting sheet 12. The light source 14 is made up of cold fluorescent lamps (CFLs) and is disposed so as to surround three sides of the light guide 13. More specifically, the light source 14 is formed in a U-shape that extends along the three sides of the light guide 13. This light source 14 is connected to a connector 17 via a lead wire 16.

In addition, the optical sheets 15 are disposed on the front side surface of the light guide 13. Furthermore, the optical sheets 15 include a diffusion film 18, a transparent conductive film 19, a diffusion film 20, a lens film 21 and a brightness enhancement film 22. The diffusion film 18 that is one of the diffusion films has a function of diffusing light from the light source 14 in the horizontal direction or in the vertical direction, and the other diffusion film 20 has a function of diffusing light from the light source 14 in the vertical direction or in the horizontal direction. The transparent conductive film 19 is made up of a transparent conductor such as ITO (Indium Tin Oxide) and has a function of absorbing noises. The lens film 21 has a function of condensing light from the light source 14 and other functions. The brightness enhancement film 22 has a function of enhancing brightness of light from the light source 14. In addition, the above mentioned films 18-22 are laminated in this order from the rear side (light guide 13 side) toward the front side.

Further as shown in FIGS. 3 and 4, a circuit board (main circuit board) 23 is provided to the rear side of the backlight unit 6 (a side of the backlight unit 6 that is opposite to the liquid crystal display panel 5 side). This circuit board 23 has a component side 23a that is formed on the rear side (a side which is different from the backlight unit 6 side). As shown in FIG. 3, the FPC 8 including the source driver 7 and the FPC 10 including the gate driver 9 are extended in the directions that are perpendicular to each other and are bent toward the rear side so as to be connected to the component side 23a of the circuit board 23. The FPC 10 is connected to the circuit board 23 via the connector 27. In addition, the source driver 7 and the gate driver 9 are covered with a protection sheet 24 in a state where the FPC 8 and the FPC 10 are connected to the component side 23a of the circuit board 23.

Further as shown in FIGS. 2 and 3, a plurality of electronic components 25 including a control IC (Integrated Circuit) are mounted on the component side 23a of the circuit board 23 (a surface of the circuit board 23 which is different from the backlight unit 6 side). At this point, a surface of the circuit board 23 that is closer to the backlight unit 6 is not provided with a component side. In other words, the above mentioned electronic components 25 and the like are mounted only on the surface of the circuit board 23 which is different from the backlight unit 6 side (i.e., the component side 23a).

At this point, in the first embodiment, a brightness sensor 26 for measuring brightness of light emitted from the backlight unit 6 is mounted on the component side 23a of the circuit board 23 (on the surface of the circuit board 23 which is different from the backlight unit 6 side), together with the above mentioned plurality of electronic components 25 as shown in FIGS. 2 and 3. This brightness sensor 26 has a light receiving portion 26b formed on the mounting surface 26a of the brightness sensor 26 as shown in FIG. 4. Therefore, the light receiving portion 26b of the brightness sensor 26 faces the backlight unit 6 in a state where the brightness sensor 26 is mounted on the component side 23a of the circuit board 23 (surface of the circuit board 23 which is different from the backlight unit 6 side).

In the first embodiment, an opening portion 23b for the light from the backlight unit 6 to pass through is formed in a predetermined region on the end portion side of the circuit board 23. This opening portion 23b is formed by punching or drilling the circuit board 23. The above mentioned brightness sensor 26 is disposed at a region corresponding to the opening portion 23b of the circuit board 23. More specifically, the brightness sensor 26 is mounted on the component side 23a of the circuit board 23 so as to cross the opening portion 23b of the circuit board 23 and so that the light receiving portion 26b of the brightness sensor 26 is disposed at a region corresponding to the opening portion 23b of the circuit board 23. Since the brightness sensor 26 is disposed as described above, the light that passes through the opening portion 23b of the circuit board 23 can enter the light receiving portion 26b of the brightness sensor 26. In addition, an opening portion 11a for lighting is formed in the bottom surface of the backlight cover 11.

As described above concerning the first embodiment, the brightness sensor 26 is not fixed directly to the bottom surface of the backlight cover 11 that becomes high temperature but is mounted on the circuit board 23. The surface on which the brightness sensor 26 is mounted is opposite to the backlight cover 11 side. Since the brightness sensor 26 is mounted on the surface which is different from the backlight unit 6 side, it is able to suppress a change in a brightness detection output of the brightness sensor 26 due to high temperature of the backlight unit 6.

At this point, some brightness sensor has a light receiving surface that protrudes toward light receiving direction side more than the component side in a case where the light receiving portion is formed on the component side surface. In this case, the light receiving portion 26b of the brightness sensor 26 should fit in the opening portion 23b of the circuit board 23. The present invention can be applied to such kind of case, too.

In addition, the circuit board 23 is connected to the liquid crystal display panel 5 via the FPC 8 including signal lines of the source driver and the FPC 10 including signal lines of the gate driver. In this way, as the control circuit of the display panel that is used for the backlight unit, is also mounted on the circuit board used for mounting the brightness sensor, a size of the backlight unit does not need to be large compared with a case where a special circuit board for mounting the brightness sensor is added.

The FPC 8 and the FPC 10 are extended in directions that are perpendicular to each other. Since the FPC 8 and the FPC 10 that are connected in this way are extended in directions that are perpendicular to each other, the connector for connecting with the flexible printed circuit board is mounted on the side opposite to the backlight unit side for the reason of assembling matter. The reason of assembling matter means that if the connector 27 for the FPC 10 is mounted on the surface of the backlight unit side, it is unable to do the work for attaching the FPC 10 to the connector 27 because the FPC 8 extending in the different direction is connected to the circuit board 23. Therefore, the connector 27 is mounted on the same side as the brightness sensor, so that the circuit board can have a single component side. Thus, compared with a case of double component sides, a size of the backlight unit does not need to be large. In addition, it is not necessary to mount components on both sides of the circuit board, so that manufacturing process of the circuit board can be simplified.

As described above concerning the first embodiment, using the circuit board 23 having the opening portion 23b through which the light from the backlight unit 6 can pass, the light from the backlight unit 6 can illuminate the brightness sensor 26 even though the brightness sensor 26 is mounted on the surface of the circuit board 23 which is different from the backlight unit 6 side. Thus, it is able to suppress occurrence of the problem that accuracy of measuring brightness with the brightness sensor 26 may be deteriorated when the light from the backlight unit 6 is blocked by the circuit board 23.

As described above concerning the first embodiment, since the brightness sensor 26 is disposed so as to cross the opening portion 23b of the circuit board 23, the light that passes through the opening portion 23b of the circuit board 23 can illuminate the brightness sensor 26 easily.

As described above concerning the first embodiment, since the light receiving portion 26b is formed on the mounting surface 26a of the brightness sensor 26, the light receiving portion 26b of the brightness sensor 26 mounted on the surface of the circuit board 23 which is different from the backlight unit 6 side, can be directed to the backlight unit 6. In this case, since the light receiving portion 26*b* of the brightness sensor 26 is disposed in a region corresponding to the opening portion 23*b* of the circuit board 23, the light from the backlight unit 6 can enter the light receiving portion 26*b* of the brightness sensor 26 efficiently so that accuracy of measuring brightness with the brightness sensor 26 can be improved.

As described above concerning the first embodiment, since the brightness sensor 26 is mounted on the surface of the circuit board 23 which is different from the backlight unit 6 side together with the electronic components 25 for control, it is not necessary to mount components on both sides of the circuit board 23 unlike the case where the brightness sensor 26 is mounted on the surface of the circuit board 23 that is closer to the backlight unit. Thus, the manufacturing process of the circuit board 23 can be simplified.

The above mentioned embodiment is merely an example in every respect, and it should not be interpreted in a restricted manner.

For example, although the opening portion is formed at a predetermined region on an end portion of the circuit board so as to dispose the brightness sensor at a region corresponding to the opening portion in the above mentioned embodiment, the present invention is not limited to this structure. It is possible to form the opening portion at a region other than the predetermined region on an end portion of the circuit board so as to dispose the brightness sensor at a region corresponding to the opening portion. More specifically, it is possible to form the opening portion at a region in the vicinity of the middle portion of the circuit board so as to dispose the brightness sensor at a region corresponding to the opening portion. According to this structure, it is not necessary to provide a new region to the circuit board for mounting the brightness sensor so that a size of the circuit board can be reduced.

Figure 6:
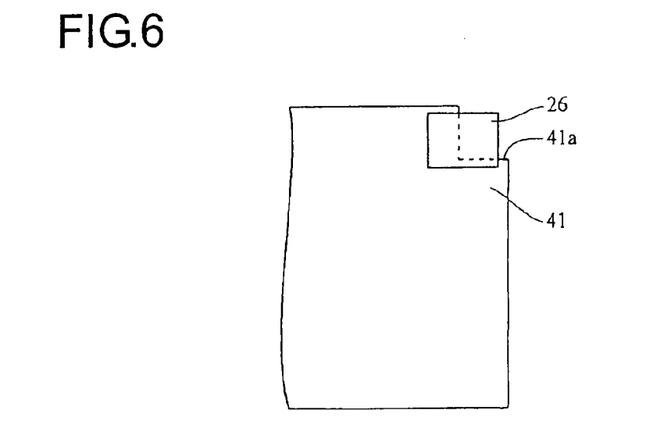
FIG. 6 is a plan view for explaining a shape of an opening portion of a circuit board included in a display apparatus according to a variation of the first embodiment.
Figure 7:
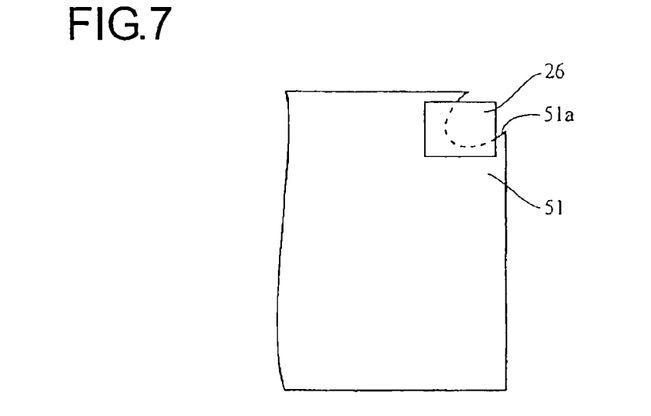
FIG. 7 is a plan view for explaining a shape of an opening portion of a circuit board included in a display apparatus according to a variation of the first embodiment.

In addition, although the opening portion for lighting is formed by punching or drilling the circuit board in the above mentioned embodiment, the present invention is not limited to this structure. It is possible to form a notch at a region on an end portion of the circuit board (see FIGS. 5-7) as the opening portion for lighting. At this point, FIGS. 5-7 are simplified plan views of the circuit board.

Figure 5:
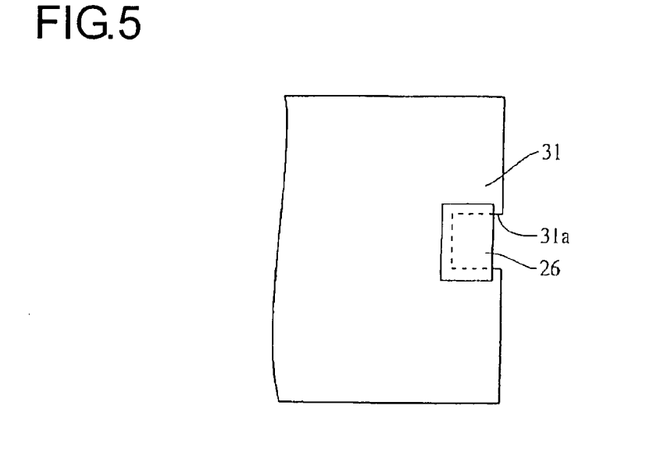
FIG. 5 is a plan view for explaining a shape of an opening portion of a circuit board included in a display apparatus according to a variation of the first embodiment.

More specifically, an edge side of the circuit board 31 may be cut so as to form a rectangular notch as the opening portion 31*a* for lighting as shown in FIG. 5. Alternatively, as shown in FIG. 6, a corner of the circuit board 41 may be cut so as to form a rectangular notch as the opening portion 41*a* for lighting. Alternatively, as shown in FIG. 7, a corner of the circuit board 51 may be cut so as to form a semi ellipse notch as the opening portion 51*a* for lighting. At this point, the brightness sensor 26 is mounted on each of the regions corresponding to the opening portions 31*a*, 41*a*, and 51*a* of the circuit boards 31, 41, and 51 shown in FIGS. 5-7 in the same manner as the above mentioned embodiment. In addition, the notch (opening portion) in this case may have a shape that is different from the above mentioned shapes.

Second Embodiment

Next, the second embodiment will be described. As described above, the second embodiment is an example of a case where the light receiving portion is formed on the surface opposite to the mounting surface.

Figure 8:
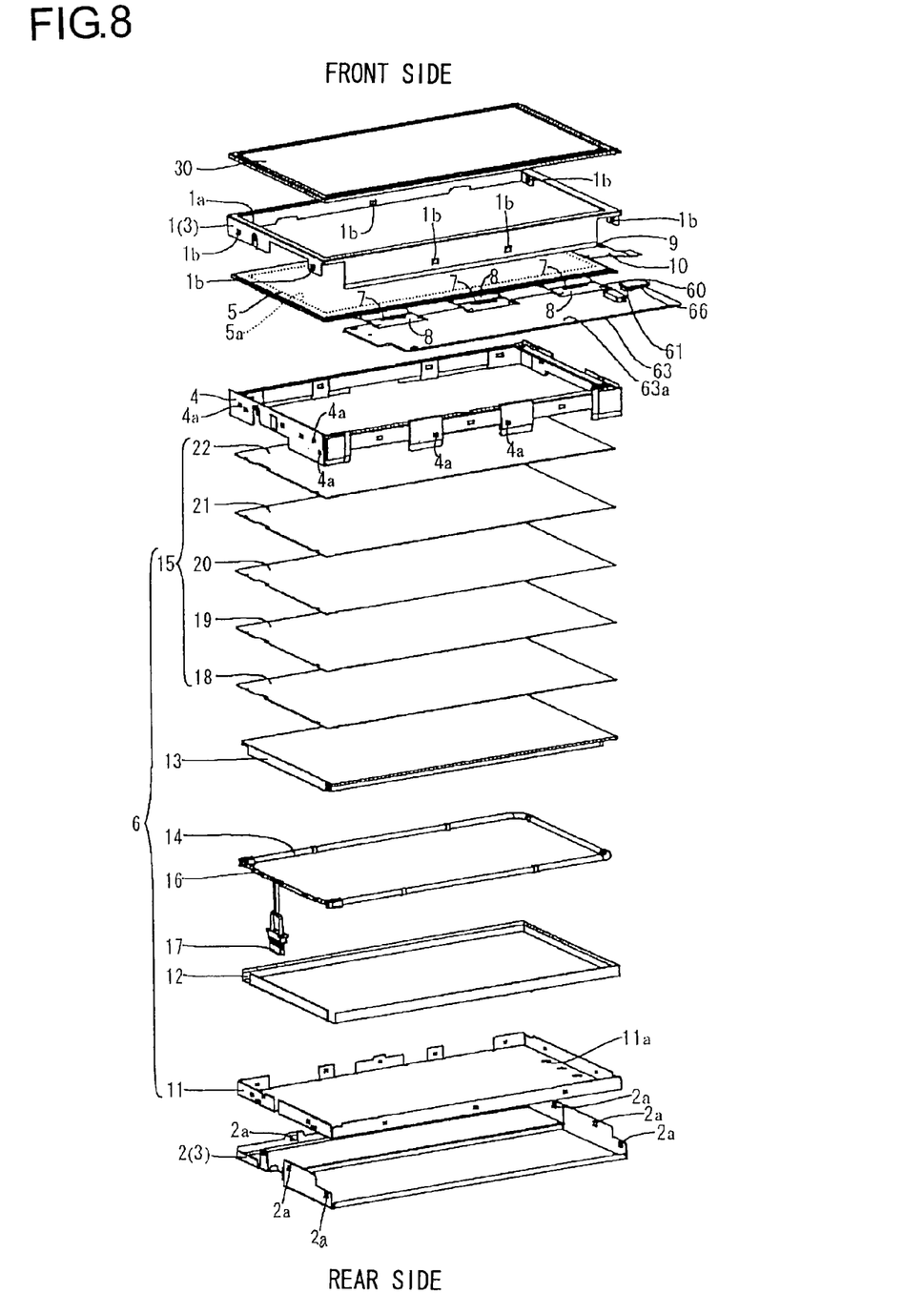
FIG. 8 is an exploded perspective view of a display apparatus according to a second embodiment.
Figure 9:
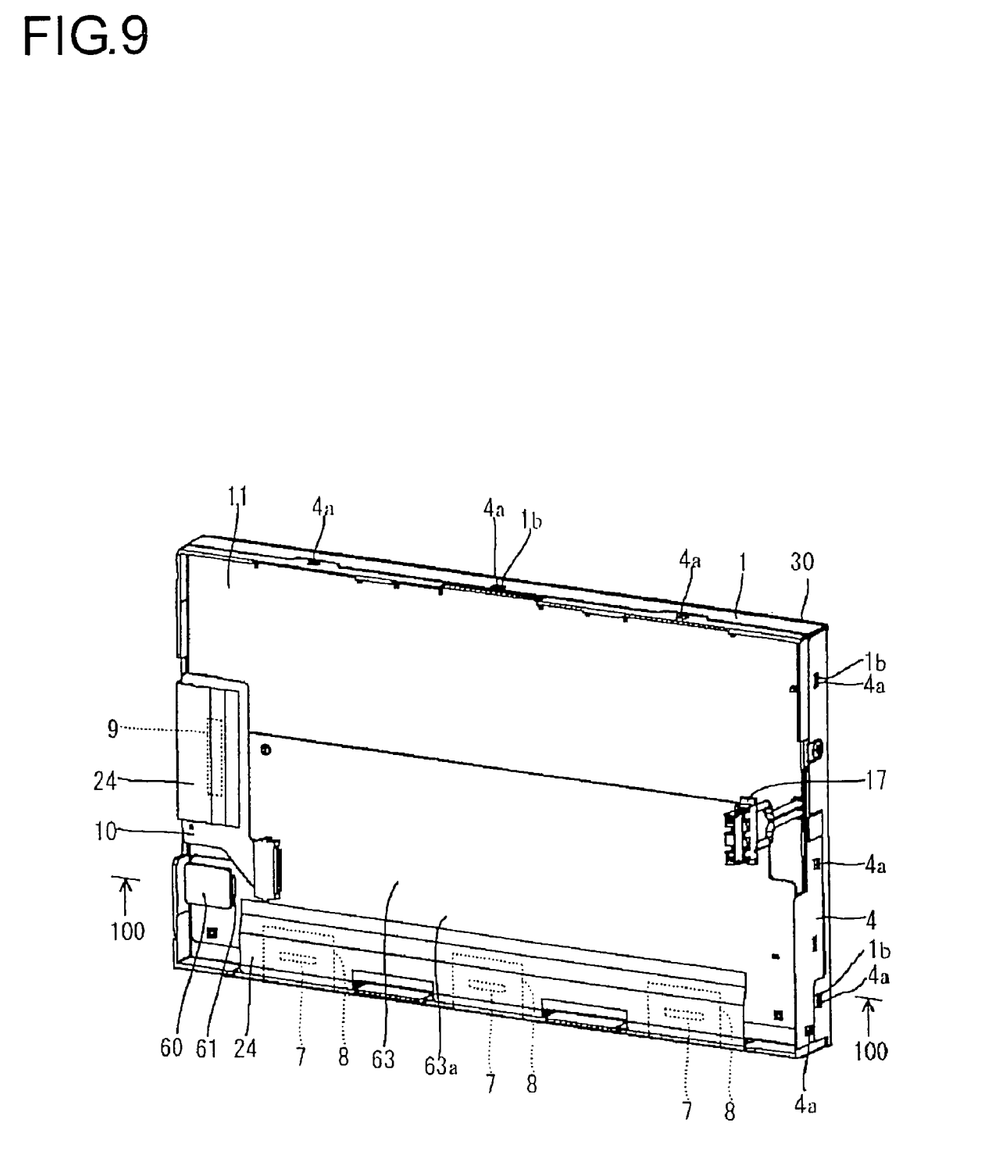
FIG. 9 is a perspective view from the rear side of the display apparatus shown in FIG. 8.
Figure 10:
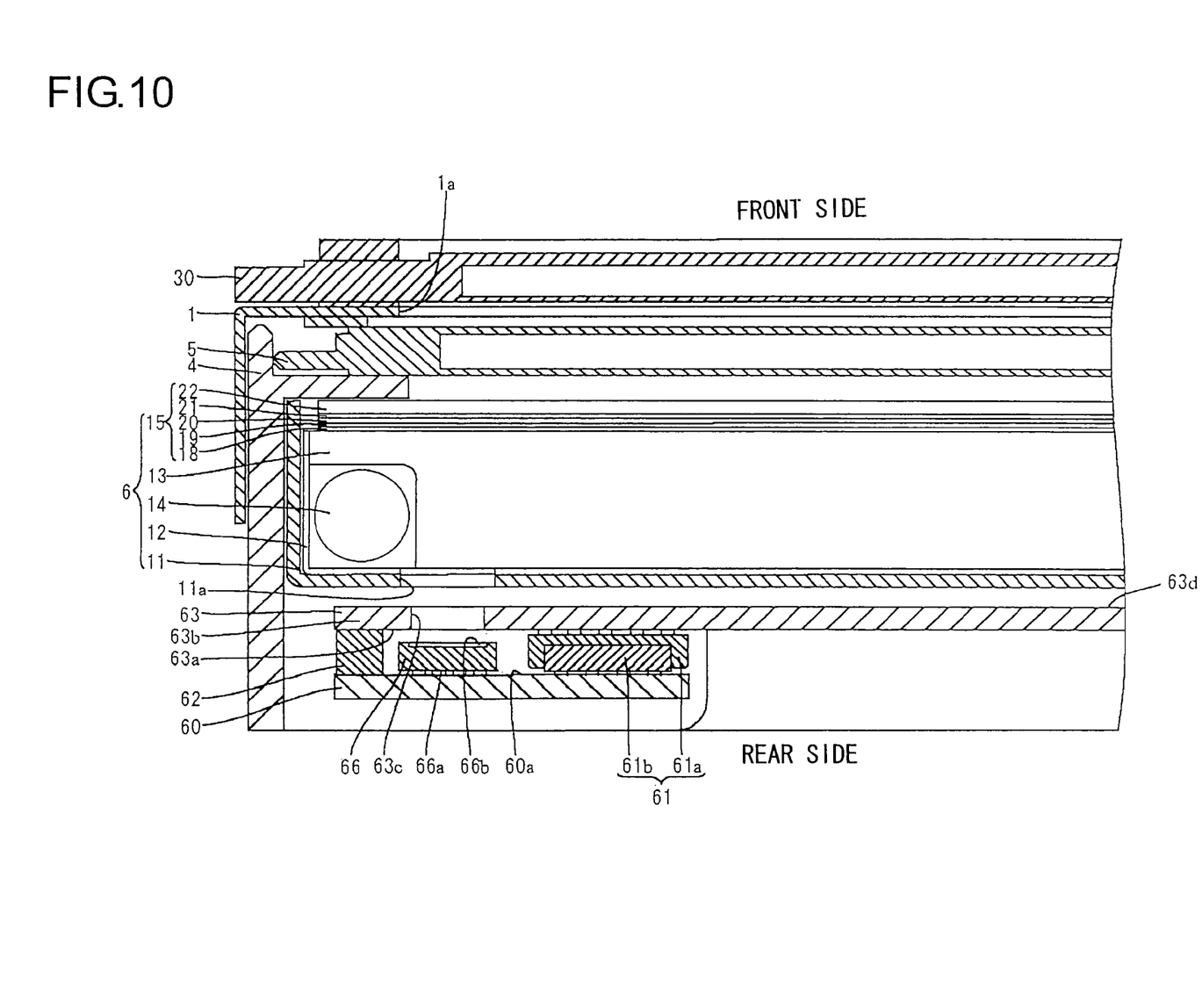
FIG. 10 is a partial cross sectional view of the display apparatus when cut along the line 100-100 in FIG. 9.

A perspective view from the front side of a liquid crystal display apparatus according to the second embodiment is the same as that of the first embodiment shown in FIG. 1. FIG. 8 is an exploded perspective view of the display apparatus according to the second embodiment shown in FIG. 1. FIG. 9 is a perspective view from the rear side of the display apparatus according to the second embodiment shown in FIG. 1 (in a state where the rear side case is removed from the liquid crystal display apparatus). FIG. 10 is a partial cross sectional view when cut along the line 100-100 in FIG. 9 (a part around the brightness sensor). First, a structure of the liquid crystal display apparatus (display apparatus) according to the second embodiment will be described with reference to FIGS. 1 and 8-10.

In comparison with the first embodiment, the same members of the second embodiment are denoted with the same reference numerals so that detailed description thereof will be omitted.

As shown in FIGS. 9 and 10, the rear side of the backlight unit 6 (the side of the backlight unit 6 which is different from the liquid crystal display panel 5 side) is provided with a circuit board (main circuit board) 63. This circuit board 63 has a component side 63*a* formed on the surface of the rear side (the side which is different from the backlight unit 6 side). At this point, the circuit board 63 is an example of the "first circuit board" of the present invention, and the component side 63*a* is an example of the "first component side" of the present invention. As shown in FIG. 9, the FPC 8 including the source driver 7 and the FPC 10 including the gate driver 9 are bent toward the rear side so as to be connected to the component side 63*a* of the circuit board 63. In addition, the source driver 7 and the gate driver 9 are covered with the protection sheet 24 in a state where the FPC 8 and the 10 are connected to the component side 23*a* of the circuit board 63 (the state shown in FIG. 9).

At this point, in the present embodiment, a sub circuit board 60 that is smaller than the circuit board 63 is disposed on the rear side of the circuit board 63 (the side of the circuit board 63 which is different from the backlight unit 6 side) as shown in FIG. 10. This sub circuit board 60 has a component side 60*a* that is formed on the surface of the front side (that is closer to the backlight unit 6). In addition, the sub circuit board 60 is disposed so that the component side 60*a* faces the component side 63*a* of the circuit board 63 with a predetermined distance at a region on an end portion of the circuit board 63. In addition, only a brightness sensor 66 and a connector 61 that will be described later are mounted on the component side 60*a* of the sub circuit board 60 unlike the component side 63*a* of the circuit board 63 on which various electronic components are mounted. At this point, the sub circuit board 60 is an example of the "second circuit board" of the present invention, and the component side 60*a* is an example of the "second component side" of the present invention.

According to the second embodiment, the connector 61 for connecting the circuit board 63 with the sub circuit board 60 electrically is disposed between the circuit board 63 and the sub circuit board 60 at a region where the circuit board 63 and the sub circuit board 60 face each other. This connector 61 is disposed so that the outer surface thereof does not protrude from the outer rim of the sub circuit board 60. In addition, the connector 61 is made up of a female connector 61*a* mounted on the component side 63*a* of the circuit board 63 and a male connector 61*b* mounted on the component side 60*a* of the sub circuit board 60. When the female connector 61*a* and the male connector 61*b* are engaged with each other, the circuit board 63 and the sub circuit board 60 are connected to each other electrically. At this point, the connector 61 is an example of the "connecting member" of the present invention. In addition, the connectors 61*a* and 61*b* are respectively examples of the "first connecting member" and the "second connecting member" of the present invention.

A fixing member 62 is disposed between the circuit board 63 and the sub circuit board 60. The fixing member 62 and the connector 61 enable the sub circuit board 60 to be fixed to the circuit board 63.

According to the present embodiment, the brightness sensor 66 for measuring brightness of light emitted from the backlight unit 6 is mounted on the component side 60*a* of the sub circuit board 60. This brightness sensor 66 has a light receiving portion 66*b* formed on the surface of the brightness sensor 66 that is opposite to the mounting surface 66*a*. Therefore, the light receiving portion 66*b* of the brightness sensor 66 faces the backlight unit 6 in a state where the brightness sensor 66 is mounted on the component side 60*a* of the sub circuit board 60. In addition, the brightness sensor 66 mounted on the component side 60*a* of the sub circuit board 60 is connected to the sub circuit board 60 electrically. In other words, the brightness sensor 66 is connected to the circuit board 63 electrically via the sub circuit board 60 and the connector 61.

According to the present embodiment, the circuit board 63 has a part 63*b* that covers a region corresponding to a mounting region of the brightness sensor 66. Further, an opening portion 63*c* for lighting is formed in a part 63*b* of the circuit board 63 that covers a region corresponding to a mounting region of the brightness sensor 66. In addition, an opening portion 11*a* for lighting is formed in the bottom surface of the backlight cover 11, too.

As described above concerning the second embodiment, the brightness sensor 66 is supported on the surface of the circuit board 63 which is different from the backlight unit 6 side. More specifically, the brightness sensor 66 is mounted on the component side 60*a* of the sub circuit board that is separated from the backlight cover 11 more than the surface 63*d* of the circuit board 63 that is closer to the backlight unit 6. Therefore, it is able to suppress a change in a brightness detection output of the brightness sensor due to high temperature of the backlight unit 6.

As described above concerning the present embodiment, since the sub circuit board 60 on which the brightness sensor 66 is mounted is disposed on the surface of the circuit board 63 which is different from the backlight unit 6 side, to which the liquid crystal display panel 5 is connected indirectly, the component side 60*a* of the sub circuit board 60 can face the backlight unit 6 also in the case where the light receiving portion 66*b* of the brightness sensor 66 is formed on the surface of the brightness sensor 66 that is opposite to the mounting surface 66*a* in the liquid crystal display apparatus having a structure in which the component side 63*a* of the circuit board 63 to which the liquid crystal display panel 5 is connected faces the side which is different from the backlight unit 6 side. In addition, since the brightness sensor 66 is mounted on the component side 60*a* of the sub circuit board 60, the light receiving portion 66*b* of the brightness sensor 66 can face the backlight unit 6.

As described above concerning the present embodiment, since the circuit board 63 having the part 63*b* that covers a region corresponding to a mounting region of the brightness sensor 66 is used, a component mountable area can be larger than that in a case of using a circuit board that does not have the part covering a region corresponding to a mounting region of the brightness sensor 66. Thus, flexibility in designing a wiring pattern on the component side 63*a* of the circuit board 63 can be improved. In this case, since the opening portion 63*c* for lighting is formed on the part 63*b* of the circuit board 63 that covers a region corresponding to a mounting region of the brightness sensor 66, it is able to suppress occurrence of the problem that accuracy of measuring brightness with the brightness sensor 66 may be deteriorated because the light from the backlight unit 6 is not blocked by the circuit board 63.

The above mentioned embodiment is merely an example in every respect, and it should not be interpreted in a restricted manner.

Figure 11:
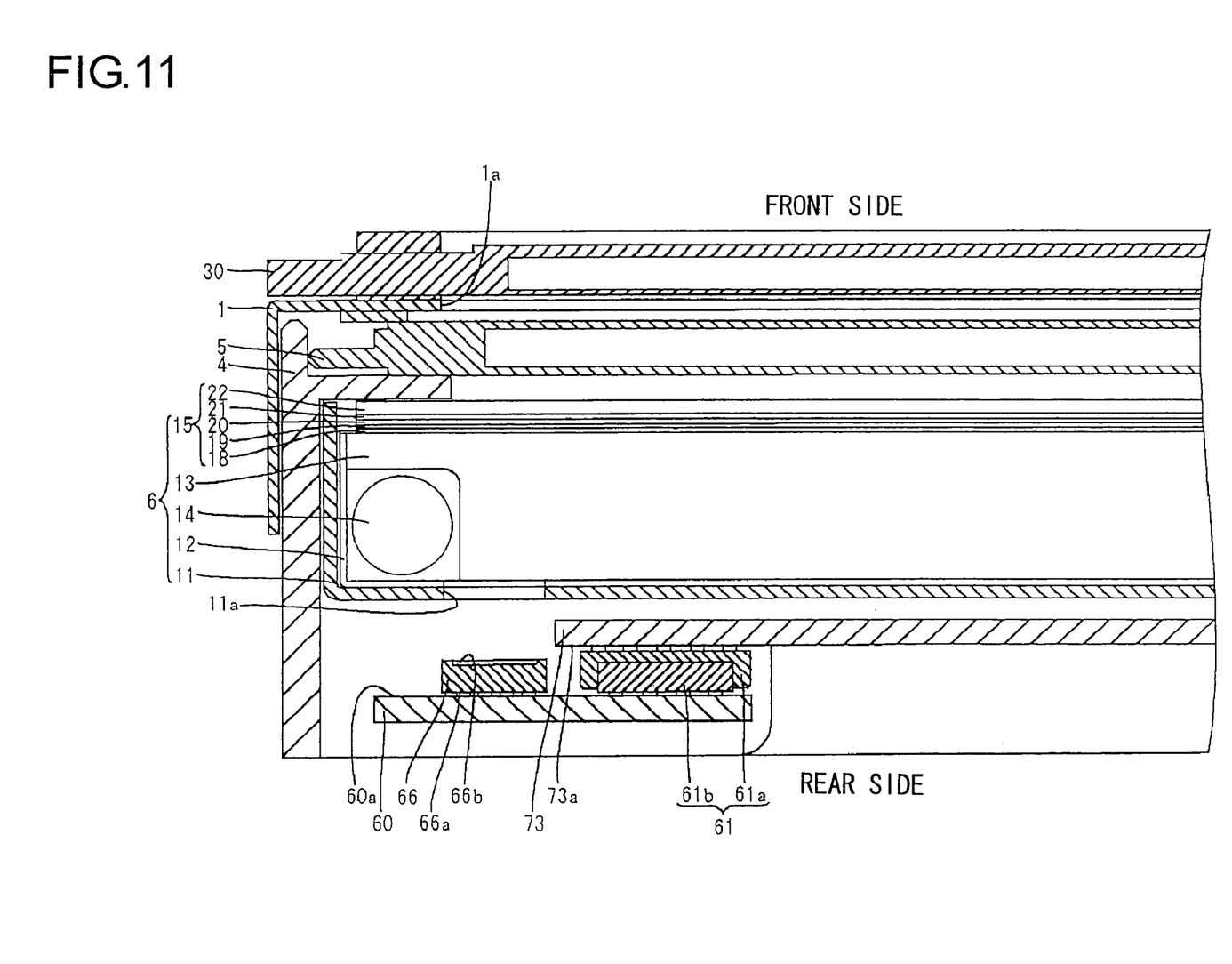
FIG. 11 is a cross sectional view of a periphery of a brightness sensor included in a liquid crystal display apparatus according to a variation of the second embodiment.

For example, although the above mentioned embodiment uses the circuit board 63 having the part 63*b* that covers a region corresponding to a mounting region of the brightness sensor 66, the present invention is not limited to this structure. It is possible to use the circuit board 73 as shown in FIG. 11. More specifically, the circuit board 73 according to a variation of the present embodiment does not have the part that covers a region corresponding to the mounting region of the brightness sensor 66. Since it is not necessary to form the opening portion for lighting in the circuit board 73 according to the variation of the present embodiment, the manufacturing process of the circuit board 73 can be simplified. At this point, the circuit board 73 has the component side (first component side) 73*a* that is formed on the surface of the rear side (the surface which is different from the backlight unit 6 side) in the same manner as the above mentioned embodiment.

It should be understood that the scope of the present invention is defined not by the description of the above mentioned embodiments but by the appended claims, which should be interpreted to include equivalent concepts of the claims and every modification within the equivalent range of claims.

What is claimed is:

1. A display apparatus comprising:
a display panel;
a backlight unit disposed on the rear side of the display panel, the backlight unit including a backlight cover that houses a light source;
a circuit board disposed on a side of the backlight unit which is different from the display panel side, wherein the display panel is electrically connected to the circuit board on a side of the circuit board which is different from the backlight unit side; and
a brightness sensor for measuring brightness of light from the backlight unit,
wherein the brightness sensor is supported on the side of the circuit board which is different from the backlight unit side such that the brightness sensor is not fixed directly to a bottom surface of the backlight cover,
wherein the backlight cover includes a first opening portion at a position corresponding to the brightness sensor, and
wherein a light receiving side of the brightness sensor is separated from the side of the circuit board which is different from the backlight unit side such that a gap exists between the brightness sensor and the side of the circuit board which is different from the backlight unit side.

2. The display apparatus according to claim 1, wherein a control circuit for the display panel is disposed on the circuit board, and the circuit board is connected to the display panel electrically via a flexible printed circuit board including signal lines.

3. The display apparatus according to claim 2, wherein the display panel is a liquid crystal panel in which each pixel has a TFT, the flexible printed circuit board is made up of a first flexible printed circuit board including signal lines of source drivers and a second flexible printed circuit board including signal lines of gate drivers, and the first and the second flexible printed circuit boards are extended in directions that are perpendicular to each other.

4. The display apparatus according to claim 1, wherein
the circuit board has a second opening portion for the light from the backlight unit to pass through, and
the brightness sensor receives light that passes through the second opening portion of the circuit board.

5. The display apparatus according to claim 4, wherein the brightness sensor is disposed so as to cross the second opening portion of the circuit board.

6. The display apparatus according to claim 4, wherein
the brightness sensor has a light receiving portion formed on a surface of the brightness sensor that is closer to the component side, and
the light receiving portion of the brightness sensor is disposed at a region corresponding to the second opening portion of the circuit board.

7. The display apparatus according to claim 4, further comprising an electronic component mounted on a surface of the circuit board, which is different from the backlight unit side.

8. The display apparatus according to claim 1, wherein
the circuit board is made up of a first circuit board, a second circuit board and a connecting member,
the second circuit board is disposed on a side of the first circuit board which is different from the backlight unit side, so that at least a part thereof faces the first circuit board,
the connecting member is disposed between the first circuit board and the second circuit board so as to connect the first circuit board with the second circuit board electrically, and
the brightness sensor is mounted on the second circuit board thereby forming the gap between the brightness sensor and the side of the circuit board which is different from the backlight unit side.

9. The display apparatus according to claim 8, wherein,
the first circuit board has a first component side, on which an electronic component is mounted, on the surface which is different from the backlight unit side, and
the second circuit board has a second component side, on which the brightness sensor is mounted, on the surface that is closer to the backlight unit.

10. The display apparatus according to claim 9, wherein, the brightness sensor has a light receiving portion formed on a surface of the brightness sensor which is different from the component side and is mounted on the second component side of the second circuit board.

11. The display apparatus according to claim 8, wherein,
the connecting member includes a first connecting member and a second connecting member that are engaged and connected electrically to each other,
the first connecting member is mounted on a first component side of the first circuit board, while the second connecting member is mounted on a second component side of the second circuit board, and
the first connecting member and the second connecting member are engaged with each other so that the first circuit board and the second circuit board are connected electrically to each other.

12. The display apparatus according to claim 8, wherein,
the first circuit board has a part that covers a region corresponding to a mounting region of the brightness sensor, and
a second opening portion for lighting is formed in the part of the first circuit board that covers the region corresponding to the mounting region of the brightness sensor.

13. The display apparatus according to claim 1, further comprising electronic components mounted on the circuit board, wherein the electronic components are only mounted on the side of the circuit board different from the backlight unit side.

* * * * *